UNITED STATES PATENT OFFICE.

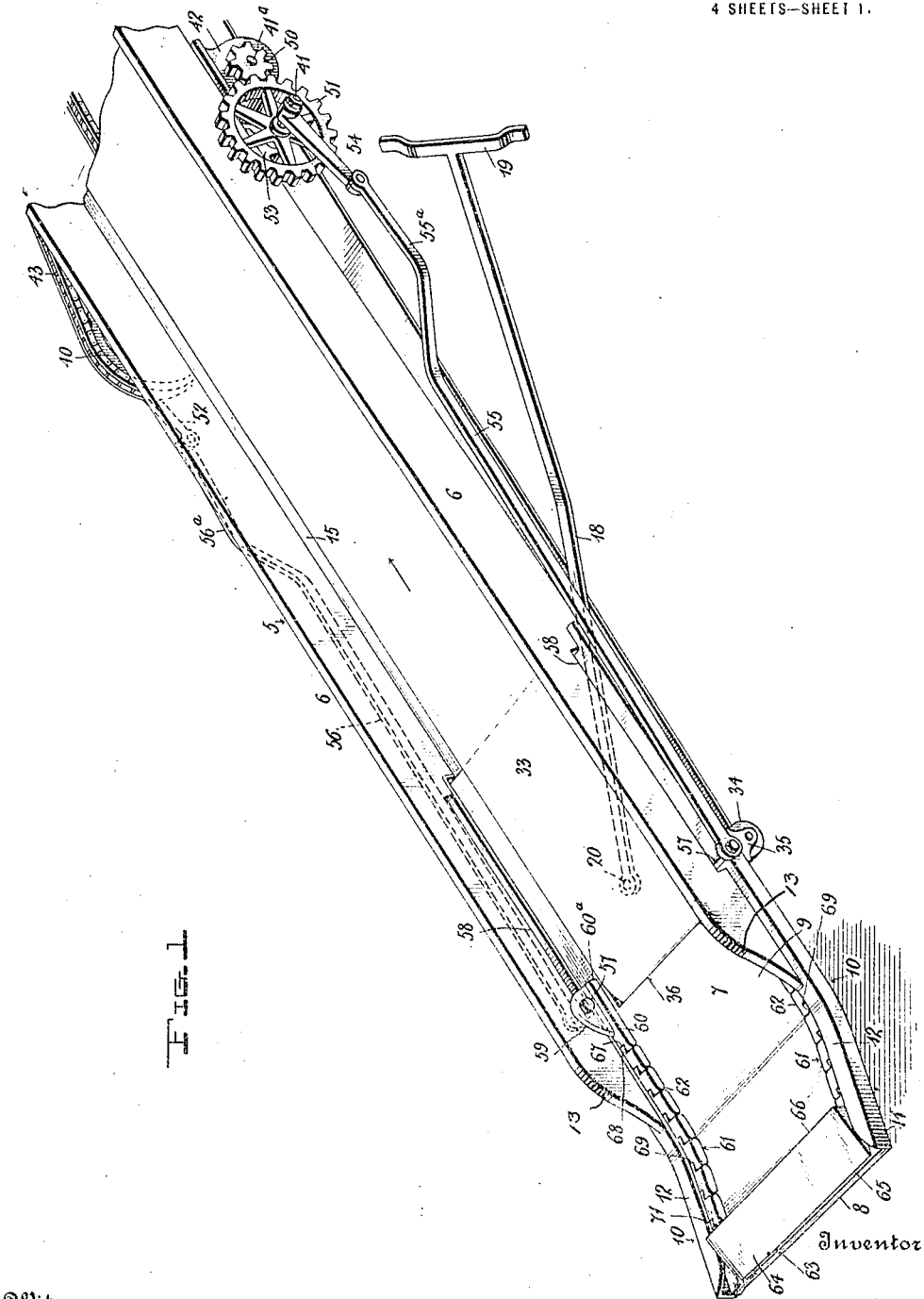

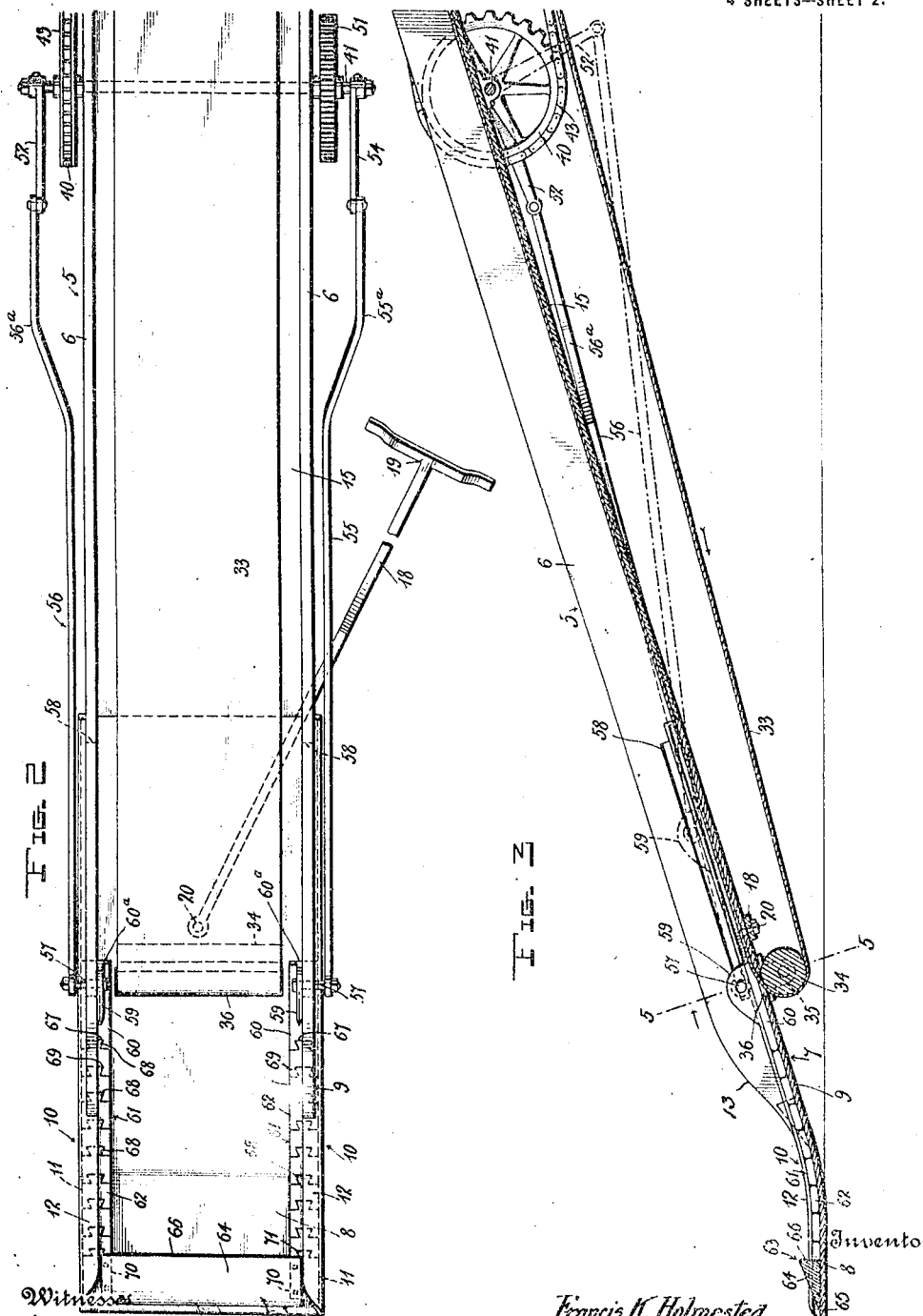

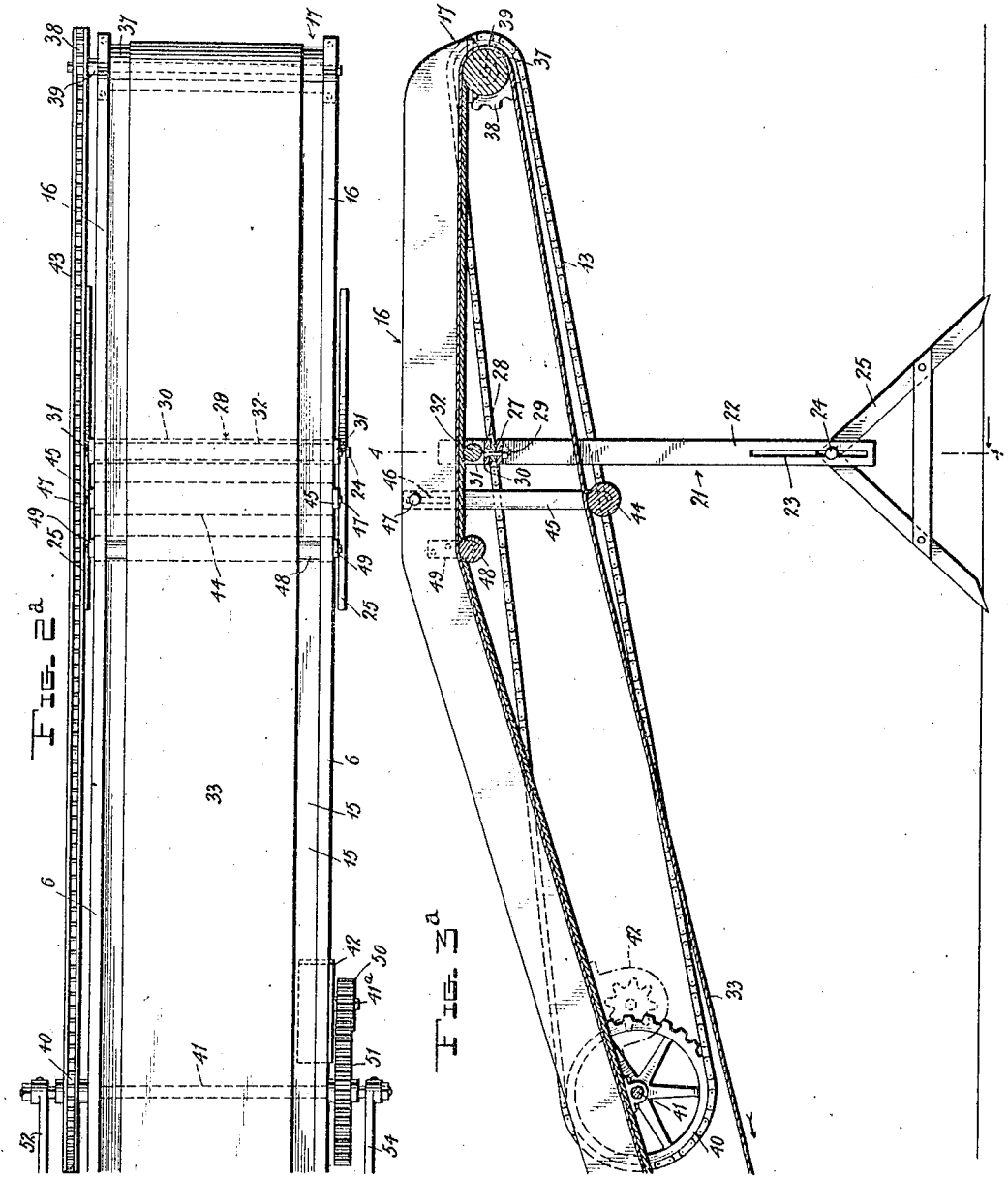

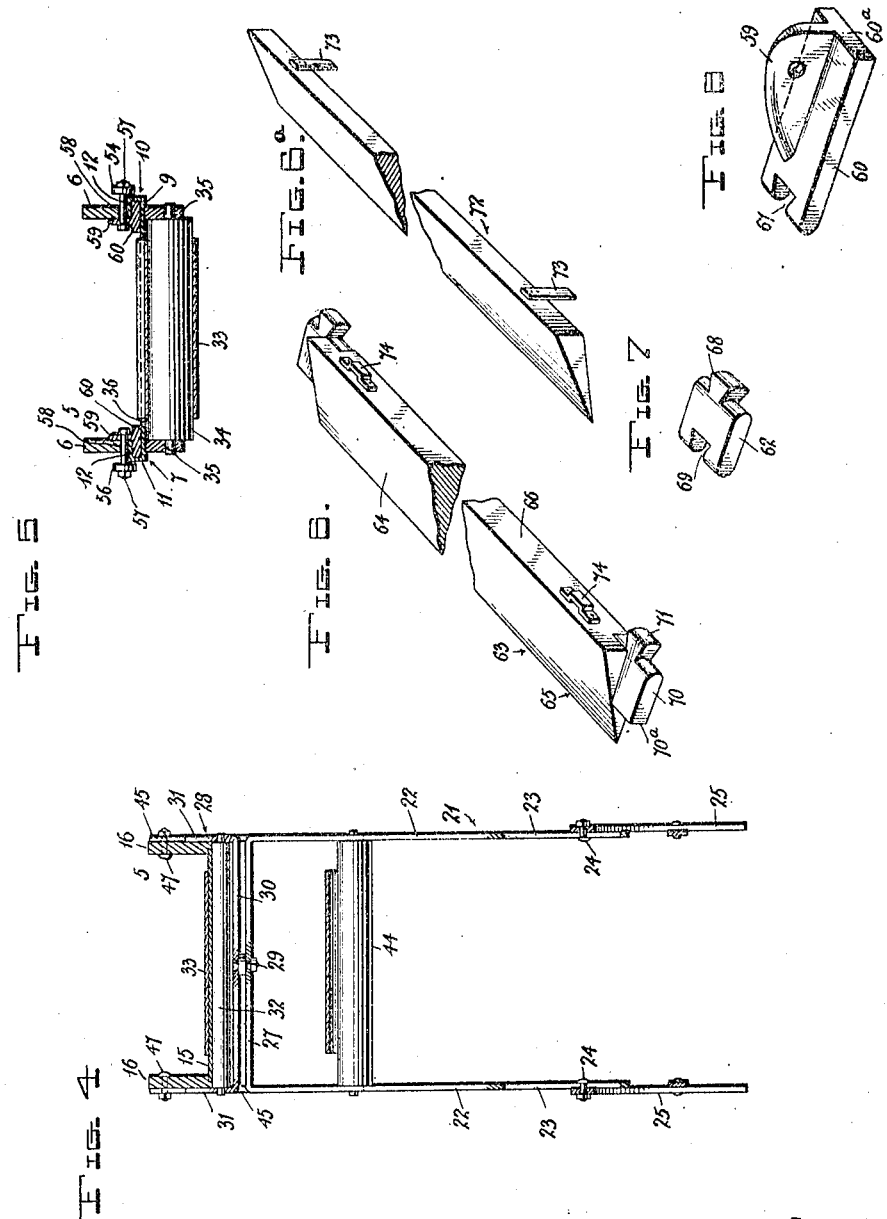

FRANCIS K. HOLMESTED, OF CHARLESTON, WEST VIRGINIA.

CONVEYING AND LOADING MECHANISM.

1,291,522.

Specification of Letters Patent.

Patented Jan. 14, 1919.

Application filed January 10, 1918. Serial No. 211,273.

*To all whom it may concern:*

Be it known that I, FRANCIS K. HOLMESTED, a subject of the King of Great Britain, residing at Charleston, in the county of Kanawha and State of West Virginia, have invented certain new and useful Improvements in Conveying and Loading Mechanism, of which the following is a specification.

This invention relates to conveying and loading mechanism used especially in handling coal or other loose material and operable to convey coal or other loose material from a storage yard into bins, or from piles, bins or storage devices to cars or other carriers for removal from one place to another, or for transportation.

One object of the invention is to convey coal or other loose material through a conveying trough or over a guiding frame organization of any preferred structure embodying a traveling conveying means, such as a belt, actuated by a motive device and connecting mechanism, all included in a simple and readily portable apparatus, the trough and conveying means being shiftable in opposite lateral directions and longitudinally movable to dispose the receiving extremity of the trough and conveying means in various positions relatively to coal or loose material. Another object of the invention is to provide a conveying organization of novel form having a receiving extremity readily placeable in loose coal or other material and provided with a reciprocating feed or supply device which operates to positively draw the coal or material toward and up to a traveling conveyer and then carried by the latter either to another place of deposit or into a car or transporting vehicle.

A further object of the invention is to generally simplify and reduce the cost of manufacture of an easily portable conveying and loading mechanism particularly adapted for loading coal, and to embody in said mechanism the motive means and other operating accessories so that the improved apparatus complete may be transported and instantly operated to perform its function at any angle and without requiring the use of tracks or specially prepared and expensive base supporting means therefor.

The invention consists in the preferred construction and arrangement of the several parts which will be more fully hereinafter described and claimed. As a means of demonstrating the effectiveness of a light, readily portable conveying organization for coal and loose material, one embodiment of the invention is illustrated in the accompanying drawings and therein:—

Figure 1 is a perspective view of the receiving extremity and a part of the trough and conveying devices of a conveying and loading mechanism embodying the features of the invention.

Figs. 2 and 2ª represent a top plan view of the improved mechanism.

Figs. 3 and 3ª illustrate a central longitudinal vertical section of the improved apparatus.

Fig. 4 is a transverse vertical section taken in the plane of the line 4—4, Fig. 3ª.

Fig. 5 is a transverse vertical section taken in the plane of the line 5—5, Fig. 3.

Fig. 6 is a detail perspective view of a reciprocating shovel end or feed device operatively disposed at the receiving end of the improved mechanism.

Fig. 6ª is a detail perspective view, broken through, of an extension attachment for the reciprocating shovel end or feed device.

Fig. 7 being a detail perspective view of one of the links of the chains or flexible connecting means for the shovel end or feed means shown by Fig. 6.

Fig. 8 is a detail perspective view of one of the rear end chain links.

The numeral 5 designates a trough or chute which has the general contour illustrated particularly by Figs. 1 and 3, and 3ª, and comprises opposite side members 6 which, for a greater portion of their length, are disposed at a downward angle of inclination and are connected at their lower extremities to a plate 7, as clearly shown by Fig. 3, this plate being shaped to rest on a floor or the ground surface and being formed with a forward horizontal portion 8 continuing into an upwardly inclined straight portion 9. The plate 7 is provided with opposite side ways 10 which are defined by bending or otherwise forming the opposite sides of the plate with vertical flanges 11 and upper inwardly directed horizontal flanges 12 intersecting the flanges 11 at right angles, as shown by Fig. 1. The lower ends of the sides 6 of the trough or chute are fitted to the upper portion of the flanges 12 and are gradually reduced in downwardly inclined planes, as at 13. The trough or chute from the plate 7 is provided with a suitable bottom 15 and the greater downwardly inclined portion of the said trough or chute continues into an upper horizontal delivery section 16 having a rear open end 17 from which the material conveyed and elevated may be deposited at any point desired. The trough or chute is longitudinally shiftable as well as laterally adjustable, the lateral adjustment of the trough being effected through a hand bar 18 secured to the under side of the plate 7 at a suitable distance above the forward end of said plate, as shown by Fig. 1, the hand bar or shifting rod having a combined breast yoke or hand grip 19 at its rear end. By this means the receiving end of the trough or chute, which is provided by the plate 7, may be readily moved in opposite lateral directions or at any angle desired to accommodate the position of the coal or other material adapted to be conveyed and elevated or loaded by the improved mechanism. The hand or shifting bar 18 is preferably fulcrumed at its lower end to the plate 7 by means of a pivot bolt 20, as shown by Fig. 3. The upper horizontal delivery section of the trough or chute is longitudinally and laterally shiftably or movably held on a support or trestle 21 having vertically adjustable side bars 22 formed with slots 23 in their lower extremities to engage clamping bolts 24 projecting from the upper ends or apices of trestle base members 25. The side bars 22 extend upwardly a suitable distance and intersect a top cross bar 27, the bars 22 and 27 constituting an adjustable arch on which a yoke 28 is pivotally mounted at the center through the medium of a fulcrum bolt 29 engaging the lower bar 30 of the yoke and the top bar 27, as shown by Fig. 3ᵃ. The side bars 31 of the yoke 28 extend upwardly and partially embrace the sides 6 of the trough or chute, and held between the said yoke side bars 31 is a roller 32 on which the horizontal delivery section 16 of the trough or chute has movable engagement and whereby the said trough or chute may be longitudinally adjusted to project or retract the receiving end thereof comprising the plate 7 relatively to the supporting trestle means for the trough or chute. The supporting trestle means for the trough or chute may be readily moved or transported with the trough or chute to any position where it is desired to utilize the improved mechanism, and the said supporting trestle means is the sole device used for holding the trough or chute in its working position.

Movable lengthwise of the trough or chute is a conveyer belt 33 which may be of any approved type. The conveyer belt 33 is operatively movable over a lower roller 34 held in suitable bearings 35 secured to the under side of the plate 7 at opposite sides of the trough or chute, the roller 34 being an idler and disposed directly beneath an opening or slot 36 formed in the plate 7. The conveyer belt 33 also moves over a driving roller 37 beneath the outlet or delivery end 17 of the delivery section 16, said driving roller having a sprocket wheel 38 connected thereto through the medium of a shaft 39 and driven from a sprocket wheel 40 on a power shaft 41 operated from a motor device 42 beneath the trough or chute. The motion transmission means between the sprocket wheel 40 and the sprocket wheel 38 consists of a chain belt 43 trained over both sprocket wheels, as clearly shown by Fig. 2ᵃ. The rollers 34 and 37 may be of any well-known type adapted to hold the belt in positive operable relation thereto, and to keep the belt in regular position or to prevent the same at its lower portion from sagging below a certain level, a guide roller 44 is held by depending hangers 45 secured to the sides 6 of the trough or chute. This roller 44 and the hangers 45 also serve as a belt adjuster, the hangers 45 having their upper extremities slotted, as at 46, and engaged by clamping bolts 47 whereby the tension of the belt 33 may be modified as found necessary. The belt 33 also moves over a direction roller 48 held by suitable bearing hangers 49 secured to the sides 6 of the trough or chute in advance of the hangers 45, the roller 48 being located at the under side of the trough or chute at the point of intersection of the front portion of the horizontal delivery section 16 with the upper terminal of the downwardly inclined portion of the trough or chute. The roller 48 serves as an anti-frictional means to provide for easy movement of the belt, as well as to accommodate the angular construction of the trough or chute.

The motor has a shaft 41ᵃ extending outwardly therefrom to one side and provided with a pinion 50 secured thereon and held in continual mesh with a spur gear 51 mounted on the power shaft 41 which is held by suitable bearing means 53 secured to the bottom of the trough or chute, the said shaft 41 having a crank arm 54. The extremity of the shaft 41 opposite that carrying the crank arm 54 and outside of the sprocket wheel 40 is provided with a similar crank arm 52, and to the crank arms 54 and 52 connecting rods or links 55 and 56 are movably attached and extend downwardly and are also secured to the outer ends of pins 57, one at each side of the trough or chute. Each pin 57 is slidable in an elongated slot 58 formed in the lower portion of the adjacent side 6 of the trough or chute. The inner ends of the pins 57 are secured in upwardly projecting flanges 59 of upper elongated terminal drive links 60 forming parts of opposite drive chains 61 composed of a plurality of shorter links 62, the said links 62 or the chains composed of said links constituting a flexible drive means which is readily conformable to the upper surface of the plate 7 over which the said chains have movement in the ways 10. The upper flanges 12 of the ways 10 prevent the chains 61 from buckling, and they are therefore caused to regularly reciprocate in opposite longitudinal directions without becoming distorted. The chains or flexible drive means 61 are connected to a shovel end or feed device 63 which is freely movable over the plate 7 fully up to the slot 36 and close to the belt 33, the said shovel end or feed device 63 being reciprocable between the inner edges of the flanges 12 and the sides 6 of the trough or chute. The upper surface 64 of the shovel end or feed device 63 is inclined downwardly to a front sharp edge 65 which intersects the lower side of said shovel end, or, the upper and lower sides of the shovel end or feed device at their point of intersection form the sharp edge 65. The rear edge 66 of the shovel end or feed device 63 is vertically straight and serves as an angular feed abutment to catch the coal or loose material and draw the latter upwardly to the belt 33. The preferred construction of the shovel end or feed device 63 and the links 62 and 60 is shown by Figs. 6, 7 and 8, in detail. The flange 59 of the upper elongated link 60 is located about centrally of the link, and the lower end of said link is formed with a dovetail recess 67 in which is fitted a dovetail coupling head 68 of the next smaller link 62, each of the links 62 being similarly formed with one of the heads 68 at one end and a dovetail recess 69 at the opposite end similar to the recess 67 of the links 60. By means of the heads 68 and the recesses or slots 67 and 69, all of the links may be readily assembled and are held in operable connection against disjointure without using pivot devices, by reason of the fact that the chains or flexible drive means 61 are movably confined in the ways 10. At its opposite ends, the shovel end or feed device 63 has links 70 fixed thereto which are substantially similar to the links 62, except the recesses or slots 69 which are obviously unnecessary in the said links 70. The links 70 have heads 71 similar to the heads 68, and by this means the shovel end or feed device 63 may be readily coupled up to the lowermost links 62 of the chains or flexible drive devices 61. The front ends of these links 70 and the rear ends of the links 60 have straight faces respectively, as at 70$^a$ and 60$^a$, to keep the ways 10 free of accumulations.

In handling certain fine materials it may be necessary to increase the vertical extent of the rear edge or angular feed abutment 66 of the shovel end or feed device 63, and to accomplish this a supplemental extension attachment 72 similar in form to but smaller than the device 63 is used and provided with rear pins 73 to removably drop into sockets or loops 74 on the rear edge 66 of the said device 63. This attachment may be readily applied to or disconnected from the device 63.

It will be understood that the conveyer belt 33 travels upwardly and rearwardly in the trough 5 and moves at a higher rate of speed than the reciprocating speed of the shovel end or feed device 63 so that the coal or other material fed or pushed up and onto the belt 33 by the shovel end or feed device 63 may be moved away in an upward direction from the said shovel device with comparative rapidity. It is proposed to so proportion the several parts that the coal or other material drawn toward and onto the belt 33 will be continually supplied to the latter in relatively large charges. It will also be seen that the crank arms 54 and 52 have a long stroke so as to give an extended reciprocation to the pins 57 and the shovel end or feed device 63 connected to said pins, the link rods or bars 55 and 56 being bent at their upper extremities respectively, as at 55$^a$ and 56$^a$ for practical connection to the crank arms and also to permit the greater portion of the said link rods or bars 55 and 56 to reciprocate closely to opposite sides of the trough or chute.

From the foregoing description, the operation of the improved mechanism will be readily understood. The trough or chute may be disposed in any position desired or be moved forwardly or backwardly and swung to the right or left by pushing or pulling on the shifting bar 18 to dispose the receiving end of the trough or chute and the shovel end or feed device 63 in the best possible position relatively to the coal or material to be operated upon or gathered by the shovel end or feed device. The shovel end or feed device 63 on the forward thrust enters the material, and being sharp at its front portion and provided with an inclined top side 64, allows the coal or material to readily pass over the same and become lodged behind the abutment 66. On the return thrust or rearward movement of the shovel end or feed device 63, the coal or material gathered behind the abutment 66 will be dragged by the latter upwardly and rearwardly over the plate 7 and deposited on the conveyer belt 33 which, traveling in a rearward direction through the trough 5, will cause the coal or material to be elevated and finally delivered through the outlet end 17 into a car, vehicle, receptacle, or be deposited in any other manner desired.

In view of the extremely light weight of the improved mechanism, disposition thereof may be made for active service in a convenient manner, and it will be found more particularly adapted and useful in mines in taking coal from low cuts and conveying the same to the cars without requiring laying of track rails or the use of bracing devices, as the improved mechanism may be readily installed in working position on the ground or floor of the cut and adjusted as found necessary to dispose the feed end in the best possible position for engaging the coal. It will be understood, however, that the improved mechanism has a general use and application.

The plate 7 of metal and shaped as shown and described combined with the readily shiftable trough or chute 5 having conveying means together with the reciprocating metal feed device 63 movable over and close to the said plate practically forms an elongated shovel with a reinforced penetrating or receiving extremity that may be easily forced into a coal heap or pile and provided with both feeding and conveying means. In practice, the plate 7, feed device 63, and the chains or flexible driving means 61 will be formed of suitable metal of a degree of hardness sufficient to withstand vigorous usage and wear.

What is claimed is:

1. In a machine of the class specified, the combination of a chute, an inclined plate at the lower end of the chute having a feed device movable over the top of the same to collect material deposited thereon, mechanism for operating the feed device including flexible connections for said device held in place by opposite portions of the plate and conveying means to which the material is fed by said device.

2. In a machine of the class specified, a chute, a plate at the lower end of the chute to be shoved under loose material, a sliding feed device working over the face of said plate and also entering the loose material and drawing the latter to the rear of the plate, mechanism for operating the feed device comprising flexible connecting devices conforming to and held in place by the plate, and conveying means to receive the material from the said feed device.

3. In a machine of the class specified, a trough or chute provided with conveying means, a metal plate secured to the lower inlet extremity of the trough or chute and having a feed device mounted to reciprocate over the top thereof, mechanism for reciprocating the feed device including flexible connections attached to the opposite ends of the device and held in place and guided by the sides of the plate, and means for operating the said feed device.

4. A machine of the class specified comprising a trough or chute with conveying means, and a lower penetrating shovel end having a straight inclined portion merging into a horizontal extremity to enter loose material, a feed device movable over the top of the shovel end and reduced in thickness toward the front edge of the same, mechanism for operating the feed device and including flexible connecting means for the feed device, said connecting means moving directly in contact with the upper opposite side portions of and automatically conforming to the surface shape of the shovel end.

5. A machine of the class specified having a shovel plate at its receiving extremity curved in shape to enter loose material and provided with side housings open at their inner opposing portions having a similar curvature, a reciprocating feed device closely movable over the top surface of said plate, jointed reciprocating connections for the feed device movable within the said housings and flexibly conforming to the curvature of the plate during their operation to hold the feed device in engagement with the plate, and conveying means toward and from which the feed device has movement.

6. A machine of the class specified constructed in the form of an elongated shovel having conveying means and shiftable longitudinally and in opposite lateral directions and provided with a shovel plate at the receiving extremity, a feed device mounted to reciprocate in close contact with and over the upper surface of the plate and to collect loose material and draw it toward the conveying means, and mechanism for reciprocating the feed device and including flexible guide connections attached to opposite ends of the feed device and housed by side portions of the plate.

7. In a machine of the class specified, the combination of a shovel plate having a wedge-shaped device slidably mounted thereon and operative to move forwardly and rearwardly, means for operating said device including flexible chains connected to the ends of the wedge-shaped device and composed of links movably jointed, a portion of the links being formed as parts of the opposite ends of the said device, and a conveyer to receive material moved over the shovel plate by the said device.

8. In a machine of the class specified, a shovel plate having an upward and rearward curve, a slide piece serving as a feeding device and mounted on the top of the said plate and having a forward and rearward motion, confined flexible drive means connected to said slide piece and conforming to the curve of the shovel plate during operation thereof, and means for operating the flexible drive means.

9. In a machine of the class specified, a shovel plate having a lower horizontal portion, an intermediate upward curve and an upper angular portion, a feeding slide piece mounted on the shovel plate and having a forward and rearward motion imparted thereto, flexible chains connected to said slide piece and operating to both pull and push the latter and conforming in their operation to the shape of the shovel plate, and conveying means to receive material from the slide piece.

In testimony whereof I have hereunto set my hand in presence of two subscribing witnesses.

FRANCIS K. HOLMESTED.

Witnesses:
 CHAS. S. HYER,
 JAMES L. NORRIS.